Dec. 26, 1967     F. S. GUROS ETAL     3,360,724
APPARATUS FOR ANALYZING ELECTRICAL SIGNALS
INCLUDING MAGNETIC STORAGE MEANS
Filed Oct. 30, 1964     2 Sheets-Sheet 1

INVENTOR.
FRANK S. GUROS
JAMES R. BRADFORD
BY H. S. Mackey
ATTORNEY.

INVENTOR.
FRANK S. GUROS
JAMES R. BRADFORD
BY H. A. Mackey
ATTORNEY.

3,360,724
APPARATUS FOR ANALYZING ELECTRICAL
SIGNALS INCLUDING MAGNETIC STORAGE
MEANS
Francis S. Guros, Yorktown Heights, and James R. Bradford, Pleasantville, N.Y., assignors to General Precision, Inc., a corporation of Delaware
Filed Oct. 30, 1964, Ser. No. 407,648
17 Claims. (Cl. 324—77)

ABSTRACT OF THE DISCLOSURE

Apparatus for analyzing electrical signals. The input signal to be analyzed and the output of a sweep oscillator are simultaneously fed to a balanced modulator. A variable band-pass filter network peaked at the same frequency throughout its range, say 100 kc., connects the output of the modulator to the input network of a detector. The oscillator sweeps through its frequency range until the filter passes a signal to the detector, the frequency of the input signal being a function of the time measured from the beginning of the sweep cycle until the modulated signal is passed through the filter. The detector then produces an output signal proportional in amplitude and spectral width to the amplitude and spectral width of the input signal. This detected output signal is then recorded on a magnetic recording disk whose rotation is synchronized with the sweep cycle of the oscillator. Hence, the position of the rerorded signal on the disk will be a measure of the input signal's frequency. The detected output signal, may, depending upon the operational mode of the apparatus, alternatively be displayed on a cathode ray tube, or simultaneously be recorded and displayed.

---

The present invention relates to electrical signal analyzing devices, sometimes referred to as a spectrum analyzer. Spectrum analyzers, in currently available form, provide a means of analyzing electrical signals so as to determine the frequency, amplitude and spectral width or density of the electrical signal. Frequency of such signal is normally determined by relating the frequency value to time, normally, the sweep time of a sweep oscillator through a predetermined band of frequencies. The amplitude and spectral width or density of the analyzed signal is normally converted to a signal of predetermined amplitude and spectral width or density which has been modified in amplitude and spectral width or density by the electrical signal to be analyzed.

Various current models of spectrum analyzers present the analysis information in various ways. Some spectrum analyzers present the analysis information on a chart which is scaled as by a graph. This type of presentation must then be measured to determine the exact extent of the information provided. Also, because of friction on the writing instrument, usually a pin, a lag is introduced and it is normal procedure to take several samples of the analysis information so that an average of the analysis information may be obtained. Thus, absolute accurate analysis information is not always available, since only an average analysis is obtained.

Other spectrum analyzers provide visual display of the analysis information, as on a cathode ray tube, for example. However, immediate presentation of a running analysis of the electrical signal is often confusing if it is desired to observe an electrical signal in a particular form or particular part of a cycle.

Methods of recording and/or storing the electric signal have been attempted with some success. However, faithful reproduction through playback of the recorded or stored signal was overcome only by employing very expensive memory tubes having very short life. The cost of components in this latter arrangement rendered spectrum analyzers, using memory tubes, almost prohibitive. Further, it is normal to store the signal to be analyzed rather than the analysis information itself.

The present invention provides a spectrum analyzer which employs a recording and playback arrangement which avoids the use of expensive memory tubes and includes a novel approach to the storage or recording and playback of the analysis information in which fidelity of the analysis information is absolutely preserved between recording and playback.

Synchronization is maintained between the recording or storage means and the sweep oscillator during a relatively long time analysis-storage cycle for purposes of signal analysis and storage of the analysis information. A repetitive, short time analysis information display cycle permits long time observation and study of the accurately presented analysis information, on a cathode ray tube, during which the sweep oscillator may be manually adjusted. By the use of common circuitry, parallax and non-linearity of amplitude and frequency marks during the visual presentation is prevented, with adjustment of both the amplitude marker and frequency marker during the short time repetitive analysis display cycle.

Through the use of a relatively long time analysis period more information may be obtained during the relatively slow sweeping process and a more accurate analysis is provided. Presentation of the analysis information is made under controlled conditions by essentially compensating for effects that may develop because of the shorter time period of the analysis display cycle affecting conditions during playback of the stored analysis information.

Thus, the present invention provides a spectrum analyzer which is low in cost and provides analysis and storage of the characteristics of electrical signals over a long time period with accurate, repetitive display of such information over a short time period having some features novel to spectrum analyzers and other features normally substantially exclusive to extremely expensive spectrum analyzers.

It is an object of the present invention to provide a spectrum analyzer for analyzing electric signals in which the analysis information is stored on a recording means rotating at one speed and which may display the analysis information on a cathode ray tube with the recording means rotating at another speed.

A further object is to provide a spectrum analyzer for analyzing electric signals in which the electric signal is analyzed and the analysis information is stored on a recording means along with a reference signal of constant predetermined frequency.

Another object is to provide a spectrum analyzer for analyzing electric signals in which a reference signal of predetermined frequency is stored with the analysis information on a recording means, the storage of both the reference signal and the analysis information being done under identical conditions.

A further object is to provide a spectrum analyzer which analyzes electric signals and stores such analysis information along with a reference signal, of constant predetermined frequency, and thereafter displays the analysis information during which time the gain of the analysis information is controlled by the stored reference signal, thereby exactly duplicating the stored analysis information during playback.

A further object is to provide a spectrum analyzer for analyzing electric signals in which electric signals are analyzed over a long term basis and the analysis information is recorded and stored for future presentation on a short term basis.

A further object is to provide a spectrum analyzer for analyzing the characteristics of electric signals in which electric signals are analyzed and the characteristics of the electric signal so analyzed are represented by a modulated signal having characteristics, which represent the detected characteristics, the value of which are proportional to the characteristics of the analyzed electric signal and in which the modulated signal is recorded and stored along with a reference signal and during playback the gain of the modulated signal is controlled by the reference signal which was recorded along with the modulated signal.

These and other objects will become apparent from reading the following description in conjunction with the accompanying drawings in which.

Figure 1:
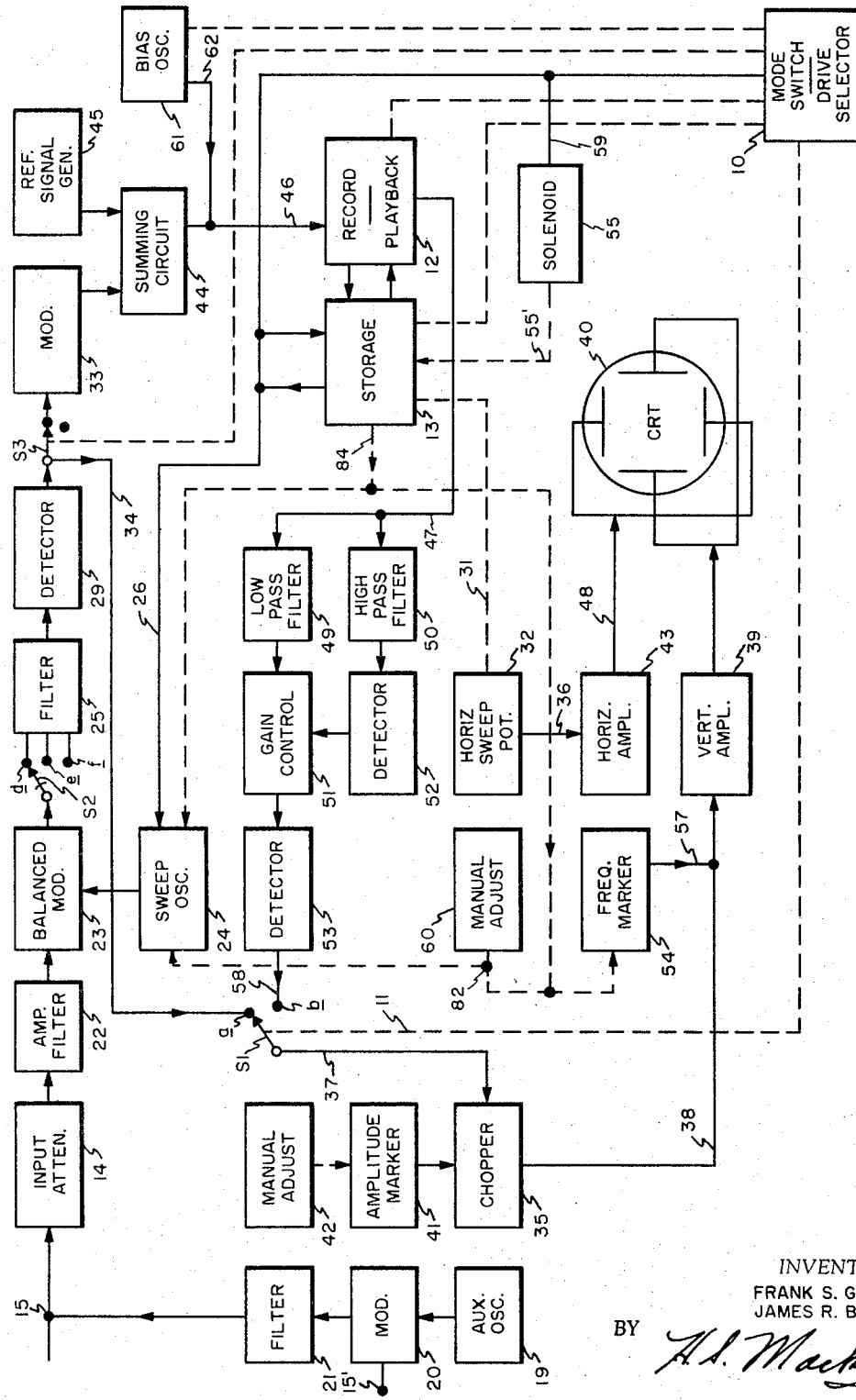
FIG. 1 is a block diagram of the present invention.

Describing the present invention relative to the block diagram of FIG. 1, block 10 represents a mode switch-drive selector. Such selector device in its preferred form comprises a multiposition switch having several banks of contacts, and functions to provide suitable means for selecting among several modes of operation as well as serving as an "on-off" switch. As will be described in more detail below, these modes of operation may be analysis-storage, analysis-display, cursory-display and manual operation.

In normal usage, the analysis-storage mode is used to analyze the signal or wave input and to record the analysis information for further study. At the same time, the analysis information is displayed visually. This mode of operation includes one complete cycle of operation and is repetitive only upon demand of the operator. In order to further study the anaylsis information the mode switch may be switched to analysis-display. In this second mode, the analysis information is displayed visually in a single cycle or may be displayed repetitively in each of a series of automatically repeated cycles over a shorter time period to display the entire signal information and maintain persistence of the display.

The cursory display is a third mode of selectable operation in which a visual display of analysis information is provided so that the viewer or operator may determine if he is analyzing the signal he wants to analyze. In the cursory mode of operation recording of the analysis information is avoided, however, the recording means is erased, preparing the recording means for recording new analysis information.

In the manual mode of operation recording or storage of analysis information is also avoided but visual display of information is provided and the spectrum analyzer is essentially converted into a wave analyzer. The turn-off switch is also incorporated in the mode switch, for convenience, and, since it is desirable that the record-playback head of the recording or storage-playback device be lifted away from the recording-playback track while the device is turned off, the record-playback head linkage is coupled to the mode switch for positioning.

Also incorporated in the mode switch, as represented by block 10, is a drive selector which selects one of several driving means for driving the storage disc and other components at the various desired speeds of rotation.

For the mode of analysis-display, the switch S1 is in its position b. For all other modes of operation the switch S1 is in its position a, as illustrated. As represented by broken line 11, the switch S1 is positioned by operating the selector switch to the mode of operation desired.

In the block diagram solid lines represent electrical connections between the blocks and broken lines represent mechanical connections, or the equivalent thereof, between the blocks and/or switches.

The blocks 12 and 13 represent a record-playback head 12 and an endless magnetic recording track and disc, storage 13. The block 13 also includes several drive motors for rotating the disc, with the motor to be employed for driving the disc selectable, by the drive selector, according to the mode of operation selected. The basic components of the blocks 12 and 13 are pictorially illustrated in FIG. 2.

Referring in general to the operation of the present invention, the signal to be analyzed is applied to the input attenuator, block 14, via terminal 15. In its preferred form the input attenuator is designed to pass a signal, the frequency of which is within the band of frequencies of 10 cycles per second (10 c.p.s.) to 100,000 cycles per second (100K c.p.s.). Essentially, the signal which may be accepted for analysis is within the sonic range of frequencies and above, however, a band of high frequencies could be accepted for analysis by providing an auxiliary oscillator such as represented by block 19; a balanced modulator, represented by block 20 and a filter, represented by block 21. If the auxiliary oscillator provided a signal of, for example, 100K c.p.s. and the signal to be analyzed were applied to terminal 15' and both the signal to be analyzed and the output of the oscillator 19 were applied to the balanced modulator, 20, the band of frequencies acceptable for analysis may be 100K c.p.s. to 200K c.p.s. The filter 21 may be tuned to pass signals of 10 c.p.s. to 100K c.p.s. The balanced modulator 20 essentially subtracts 100K c.p.s. from the signal input at 15', thus the output of the filter at input 15 may be within the band of frequencies of 10 c.p.s. to 100K c.p.s.

It therefore becomes obvious that a very wide range of frequencies may be analyzed by employing auxiliary equipment such as blocks 19, 20 and 21 and by using such components to reduce the frequency of the signal to be analyzed to the acceptable range of frequencies.

With a signal within the band of 10 c.p.s. to 100K c.p.s. applied to the block 14, such signal will be passed to block 22, an amplifier-filter, which amplifies and further filters the signal. The signal output of block 22 is applied to a balanced modulator, block 23, to which is also applied the output of a sweep oscillator, block 24. The sweep oscillator 24 may be similar to the sweep oscillator which is the subject of a copending application filed by Frank S. Guros and Herbert J. Schad on Apr. 13, 1964, under the title "Wien Bridge Oscillator," Ser. No. 359,266, one of the applicants of the joint copending application being one of the coinventors of the present application.

Essentially such a sweep oscillator provides an output signal which linearly increases in frequency, with time, from a predetermined low frequency to a higher frequency, for example, from 100K c.p.s. to 200K c.p.s., as desired.

The balanced modulator adds and subtracts the frequency of the input signal from the frequency of the oscillator signal so that the output of the balanced modulator 23, is a signal whose frequencies are the sum and difference of the input frequencies.

The filter, block 25, in its preferred form is a highly stable, sharply peaked crystal filter arrangement, peaked at a predetermined frequency of 100K c.p.s., for example. The switch S2 represents a manually adjustable switch which may be positioned to any one of three input terminals d, e or f. Since it is desirable to provide signal analysis in varying degrees of bandwidth, three filter circuits are represented by the block 25, each circuit peaked at the same frequency but each filter circuit having a different predetermined bandpass width. The selected filters, 25, center frequency was chosen to pass the difference frequency from the balanced modulator, 23. In effect, the modulator 23 and filter 25 convert the input signal frequencies or spectrum to a frequency and bandwidth equal to that of the filter, depending on the frequency of the sweep oscillator.

The output of the balanced modulator 23 is applied via switch S2 to whichever terminal the switch is positioned, and to the filter circuit associated with such terminal. The terminal *d* may couple the output of the balanced modulator to a filter having a bandwidth of 10 cycles, for example, while the terminal *e* may couple the modulator output to a filter having a bandwidth of 50 cycles, for example, and the terminal *f* may couple the modulator output to a filter having a bandwidth of 100 cycles, for example. Thus it will be seen that a selection of filters, each peaked at 100K c.p.s., having different bandwidths, is provided for passing only the 100 kc. frequency from the modulator. Additional filter circuits having other bandwidths may be provided, if desired.

The signal passed by the filter 25 is applied to a detector, block 29, which detects the amplitude of the applied signal and the spectral width or density of the signal. Since the amplitude and spectral width of the sweep oscillator output signal may each be of a controlled predetermined value, these values may be employed in the detector 29 as threshold values so that the signal passed by the detector 29 may be proportional to the amplitude and spectral width values in excess of the threshold value. Thus the output of detector 29 will be proportional in amplitude and spectral width to the amplitude and spectral width of the input signal. The frequency of the input signal is a function of time of the sweep oscillator measured from the beginning of the sweep cycle to the time that the filter passes the modulated signal.

The broken lines 84 and 31 extending from the storage 13 to the sweep oscillator 24 and the frequency marker 54 and from the storage 13 to the horizontal sweep potentiometer, block 32, represent that the rotation of the storage means may be coordinated or synchronized with the sweep oscillator, the frequency marker and the horizontal sweep potentiometer.

Although the sweep oscillator 24, the frequency marker 54 and the horizontal sweep potentiometer 32 are synchronized with the same means (block 13), broken line 82 indicates that synchronization between the sweep oscillator 24 and the frequency marker 54 may be manually adjusted or even defeated altogether. Thus it should be understood that in certain modes of operation the components 24, 32 and 54 function in synchronism, while in other modes such synchronism is eliminated. Synchronism is effectively provided by the functioning of solenoid 55, operable via the mode switch 10 via lead 59. Broken line 55′ represents the manual coupling between the solenoid 55 and the storage 13, which cooperate so as to effectively control synchronism of the components 24, 32 and 54.

The signal output of the detector 29 which is proportional in amplitude and spectral width to the amplitude and spectral width of the input signal is applied via switch S3 to the modulator 33 and via lead 34 to contact terminal *a* of switch S1, as illustrated.

Thus, when switch S1 is in its position *a*, the signal output of the detector 29, is applied to a chopper, block 35. The chopper 35 includes a blanking means to blank the CRT, 40, during the signal switching the chopper from/to the detector output, 29, to/from the amplitude marker, 41, output.

In order to provide an adjustable amplitude reference and further to eliminate any parallax between an amplitude marker and the analysis information, an amplitude marker signal from block 41 is fed into the chopper 35 which feeds such signal into the vertical amplifier and on to the trace through common circuitry. This also eliminates non-linearities in the display system. The amplitude marker signal may be manually adjusted, as desired, to any amplitude within the limits of the trace, as indicated by block 42, manual adjust.

The frequency of the input signal is measurable as a function of time of the horizontal sweep as controlled by the horizontal sweep potentiometer 32, because of the synchronism among the sweep oscillator 24, the frequency marker 54 and the horizontal sweep potentiometer 32.

The horizontal sweep potentiometer is coupled to the horizontal amplifier, block 43, controlling the horizontal trace of the cathode ray tube. Therefore, the frequency of the input signal may be measured as a function of travel of the trace. Thus the output signal of the detector 29, which is proportional to the amplitude and spectral width of the input signal may be displayed on a cathode ray tube as a visual representation having an amplitude value proportional to the amplitude of the input signal and a width of trace indicative of the spectral density of the input signal. In addition, the frequency of the input signal may be visually determinable as a function of the travel of the trace on the screen of the CRT.

During the analysis-storage made, at substantially the same instant that the analysis information is displayed, the analysis information is also stored or recorded. The storage process includes applying the output of detector 29 to modulator 33. The modulator 33 provides an output of predetermined frequency, such as a 60 cycle signal, for example, which is proportional in amplitude and spectral width to the output of detector 29, which is proportional to the amplitude and spectral width of the input signal at 15.

The 60 cycle signal output of modulator 33 is applied to a summing circuit, block 44, to which a reference signal is also applied from block 45. The reference signal may be of the order of a 120 cycle signal, for example, and is applied to the summing circuit during the entire analysis-storage cycle. The output of the summing circuit is applied to the recording-playback head, block 12, which in the analysis-storage cycle, serves as a recording means for applying any signal applied thereto to the storage or recording device, block 13. When modulator 33 provides an output to the summing circuit both the 60 cycle signal and the 120 cycle reference signal are summed and applied to the recording head and thence to the storage device.

Thus it has been shown how an input signal is analyzed and stored or recorded and, at the same time displayed for visual observation. It is also obvious that the frequency of the input signal is also a function of its recorded point on the storage device because of the synchronism existing between the sweep oscillator and the storage means and the cooperation of the filter 25.

Figure 2:
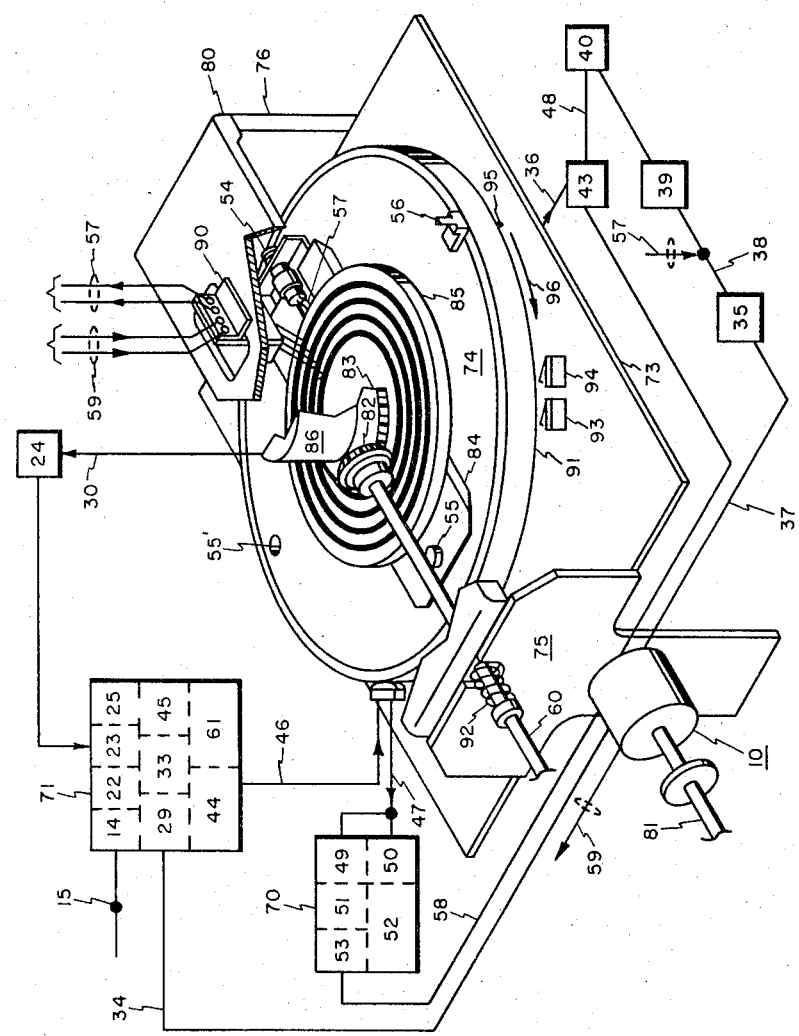
FIG. 2 is a graphic illustration of the recording means with block representations of associated functions of analysis of electric signals, application of the analysis information and a reference signal to such recording means and playback and display of the analysis information with control of the displayed analysis information by playback of the reference signal.

In its preferred form, the storage means is preferably an endless magnetic track on the periphery of a disc which is driven at a rotational speed of one revolution in two minutes, during the analysis-storage cycle. This rotational speed may be controlled by the drive selector 10 which may couple a gear mechanism or energize a particular motor or other driving means upon positioning the selector switch, represented by block 10, to the mode of operation desired. In such analysis-storage cycle position, the disc of the storage device is driven from any position that it may be in, except if the disc is in a "start" position, to a predetermined position, which may be referred to as "start." As seen in FIG. 2 the "start" position is a function of actuation of a pair of microswitches coupled to logic circuitry, the logic circuits not shown. The storage disc is coupled to the sweep oscillator, as represented by 84, by deenergization of the solenoid 55 by the mode switch 10, and the oscillator is swept through its frequency range while the storage disc is synchronously driven so as to make one complete rotation from the "start" position, at which time the analysis-storage cycle terminates. The "start" position of the disc is synchronized with the lowest frequency output of the sweep oscillator 24 and the beginning of the horizontal trace of the cathode ray tube 40 as controlled by the horizontal sweep potentiometer 32.

In the analysis-display cycle or mode of operation the analysis information stored on the storage 13 is displayed on the cathode ray tube for visual observation. The analysis-display cycle is repetitive and will automatically continue into and through a second analysis display cycle, repeating the identical information over again until the device is manually switched off or switched to another mode of operation. In this manner the analysis information may be studied as long as desired, the information having been preserved for presentation. During the analysis-display cycle the sweep oscillator is uncoupled from the storage disc through energization of the solenoid 55 and the sweep oscillator and frequency marker may be manually, synchronously positioned as represented by broken line 82 so that the frequency of the oscillator output is indicated by the frequency marker as a function of the position of the output of the frequency marker along the trace of the display.

Since the preferred embodiment provides for the use of a magnetic track recording means the information stored may be played back and may thereafter be wiped off the track by the usual method of erasing magnetic impulses from magnetic recording tracks.

To provide the analysis-display cycle, the selector switch (assumed as represented as part of block 10) would be positioned to the analysis-display position. By so positioning the selector switch, the switch S1 is positioned to its position $b$ and another driving means is selected to rotate the storage disc. Also the playback head is connected so as to pick up the magnetic impulses on the recording track while at the same time the recording head is disconnected, if two heads are used. Also, the solenoid 55 is energized thereby uncoupling the sweep oscillator and frequency marker from the storage disc.

The motor or driving means selected to drive the storage disc during the analysis-display cycle rotates the disc at a predetermined speed, substantially faster than the disc is rotated during the analysis-storage cycle. Rotation is of the order of two revolutions per second. As previously stated the speed of rotation during the analysis-storage cycle is of the order of one revolution in two minutes. The increased speed of rotation as between the analysis-storage cycle and the analysis-display cycle has the effect of increasing the frequency of the analysis information and the reference signal, each by the same factor. The horizontal sweep potentiometer 32 is mechanically coupled to storage, as indicated by broken line 31, so that the horizontal sweep of the cathode ray tube (CRT) 40, remains synchronized with the storage disc rotation during all modes of operation. Thus the horizontal sweep of the trace is increased by the same factor during operation of the analysis-display cycle.

Display of the analysis information from the storage is accomplished through the playback head, the cycle essentially starting at substantially the same starting point of the analysis-storage cycle, relative to the position of the storage disc. The signals (the analysis information and the reference signal) are picked off the magnetic recording track by the playback head and are applied to a pair of filters 49 and 50. Block 49 represents a low-pass filter which is designed to pass the frequencies and/or signals proportional to the analysis information of the input signal at 15, increased in frequency. Block 50 represents a high-pass filter which is designed to pass the frequencies and/or signals which are proportional to the reference signal, increased in frequency.

The output of the low-pass filter is applied to a gain control, block 51. Since the reference signal and the analysis information were both applied to the storage 13 under exactly the same conditions and are both played back under the same conditions then any variation and/or distortion of the analysis information signal will also be found on the reference signal. Such variation and/or distortion may have occurred during recording and/or playback due to change in spacing between the recording and/or readout heads and the storage disc or other electrical and/or mechanical disturbances.

In order to maintain fidelity of the analysis information, the reference signal passed by the high-pass filter, block 50, is applied to a detector, block 52, which detects any change in the reference signal passed by the filter 50. The output of the detector 52 is applied to the gain control 51 so that fidelity of the analysis information passed by the gain control 51 is maintained.

The output of the gain control 51 is applied to a detector 53 which provides an output, via position $b$ and switch S1 to the chopper 35.

The signal, which is proportional to the amplitude and spectral width of the input signal at 15, applied to the chopper 35, is channelled to the cathode ray tube via the vertical amplifier 39, as previously described.

During playback of the recorded analysis information and the reference signal the oscillator sweep potentiometer is released from automatic control and is under manual control. Thus the oscillator sweep potentiometer may be manually adjusted so that the frequency of the sweep oscillator output may be adjusted so as to oscillate at any frequency within the range of frequencies of the oscillator.

If desired, a frequency counter may be used to determine the actual output frequency of the oscillator.

Coordinated with the sweep oscillator is a frequency marker. The frequency marker, in its preferred form is an impulse generator, such as an inductive proximity detector in which the proximity sensor or detector head is mechanically associated with the oscillator sweep potentiometer, so as to be positively related to the frequency of the output of the sweep oscillator. The frequency marker, block 54, output is applied to the vertical amplifier. The marker appears on the trace as a "pip," such "pip" located along the trace at a point which corresponds to the frequency of the sweep oscillator output. The frequency of the oscillator output having been converted to time and time having been converted to travel of the trace, then a change in the frequency of the oscillator output may be indicated by a change in position of the appearance of the "pip" along the trace.

When the sweep oscillator is coupled to and driven by the storage, the frequency marker is also coupled to and driven by the storage. This is indicated by the extension of broken line 84 to blocks 24 and 54. When the sweep oscillator is uncoupled from the storage, the frequency marker is also uncoupled from the storage and adjustment of the sweep oscillator, relative to the frequency of the output, and the frequency marker, relative to the appearance of the generated "pip" along the trace, is made via a common manual adjustment, block 60, as indicated by broken line 82 connecting block 60 to both blocks 24 and 54.

Non-parallax and non-linearity of both the frequency marker indication and the amplitude marker signals as displayed on the cathode ray tube are provided by use of common circuitry feeding signals into the cathode ray tube.

In order to provide for a rapid observation of the input signal, a mode of operation, referred to as cursory display, is provided. With the selector switch positioned for cursory display the switch S3 (shown closed) is opened so that the signal input at 15 is not applied or fed through to the storage. Also, switch S1 is positioned to its position $a$. With the selector switch in cursory position, a drive means is energized so that the sweep oscillator is swept through its frequency range in some 10 seconds. The input signal is analyzed and applied to the cathode ray tube the same as in the analysis-storage cycle except switch S3 is open and no storage takes place. At the same time the output of the bias oscillator, block 61, is applied to the recording head, as indicated by lead 62 and to the magnetic recording track so as to remove any magnetic impulses which may have been recorded on the track and still remain thereon.

In the manual mode of operation the sweep oscillator, frequency marker and storage disc are slaved to the manual control 60. Switch S3 is held open and switch S1 is held in its position *a*. In this mode of operation the overall device may be operated as a wave analyzer.

FIG. 2 is a part graphic and part block presentation of the storage device and other associated components, with the storage device illustrated in its preferred form. Parts, components or blocks in FIG. 2 which illustrate or represent corresponding blocks in FIG. 1 are labeled with corresponding reference characters. Certain of the blocks of FIG. 1 have been consolidated into a group such as seen in blocks 70 and 71.

It will be noticed that certain of the electrical connections, such as grouped leads 57 and 59, extend from graphic illustrated terminals on 90 to line 38 (in the case of 57) and to the drum 10 (in the case of 59). It is obvious from FIG. 1 that the electrical connection via lead 26 is between the mode switch 10, and the components of the solenoid (via 59), storage 13 and the sweep oscillator 24. However, since the lead 26 is in the nature of a harness such graphic illustration has been omitted to avoid confusion. The leads 57 and 59 are illustrated as broken. It will be noticed that block 32 is mechanically connected to the storage 13 via broken line 31. This mechanical connection does not appear in FIG. 2 since, in the preferred construction, block 32, the horizontal sweep potentiometer is physically located under the carriage or mounting plate 73 in FIG. 2. Also mounted under the plate 73 are the various motors used to drive the disc 74 and other components coupled thereto. In order to present an illustration which is readily understandable, the components mounted under the plate 73, such as the horizontal sweep potentiometer, the motors or driving means and the various mechanical couplings and/or gears, are not illustrated.

The frame for supporting the various components includes the mounting plate 73, the front plate 75, the rear plate 76 and the bridge 80.

The front plate 75 supports the mode switch-drive selector 10, represented as a drum. It will be understood that the component 10 may be in the form of a plurality of switches, in a ganged disc array, for example, that are partly rotated to make the desired combination of electrical connections for providing the various modes of operation. A handle (not shown) may be connected to the rod 81 which may be coupled to the switch component, 10.

The rod 60 illustrates the coupling for selectively positioning the gear 82 with respect to the gear 83 (shown in part) so that manual adjustment of the frequency marker and the sweep oscillator potentiometer 86 may be provided. Normally the gears 82 and 83 are disengaged. By engaging the gears the rotatable bridge 84 may be manually positioned.

The frequency marker may be in the form of an inductive proximity device 54 which is mounted on the rotatable bridge 84. Also mounted on rotatable bridge 84 is a solenoid 55, which provides the slave coupling between the rotatable bridge 84 and the disc 74, by dropping a pin (not shown) into the hole 55' on the disc 74. In the analysis-display mode the solenoid holds the pin in an up position so that the disc rotates free from the rotatable bridge 84.

Coupled to the bridge 84 and rotatable therewith is a printed circuit 85 on which is found four concentric rings of conductive material. The inner two concentric rings are connected to the solenoid 55 and the lead 59 connects to the drum 10 which includes a control switch (not shown) for selectively energizing and deenergizing the solenoid according to the mode of operation selected. It should be noted that the potentiometer 86, printed circuit 85, rotatable bridge 84 and disc 74 have a common axis. As the bridge 84 rotates substantially 360° the potentiometer 86 is driven through the entire variable resistance range. The potentiometer 86 is part of the sweep oscillator 24, the electrical coupling between the potentiometer 86 and the remainder of the oscillator circuit being made through the lead 30 to the block 24. The member 90 is supported on the bridge 80 and serves to hold and position the brushes onto the concentric rings and supports the leads between the brushes and the terminals to which the grouped leads 59 and 57 are connected.

The outer two concentric rings are connected to the inductive proximity sensor unit 54. The impulse developed when the actuating member 56 passes the sensor head 54 is applied through the brushes supported by the member 90 and via leads 57 to the lead 38.

As previously stated the inductive proximity sensor head 54 is mounted on the bridge 84. The member 56, to which the inductive proximity device is responsive, is mounted on the disc 74 so that when the bridge 84 and the disc 74 are rotating out of coincidence with each other, the member 56 will pass the inductive proximity head 54 and an impulse will be generated by the sensor head 54 which may be used as a frequency marker, the impulse being applied to the trace on the cathode ray tube through lead 57 and the vertical amplifier 39.

On the periphery of the disc 74, an endless magnetic recording track 91 is mounted. In order to provide for long wear at relatively fast speeds, a resilient back for supporting the track is used. The recording-playback head 12 is mechanically linked (not shown) to the mode switch-drive selector 10 so that the recording head may be selectively positioned with respect to the recording track or the playback head may be selectively positioned to the recording track, according to the mode of operation selected, and removed from the track when the device is turned off.

As previously described during the analysis-storage cycle the input signal at terminal 15 is analyzed with respect to its amplitude and spectral width. When the selector switch is positioned to analysis-storage mode, the solenoid 55 is deenergized and extends its pin, and the disc 74 is rotated slowly (at a speed of one full rotation in two minutes). The disc 74 is rotated free of the rotatable bridge and when hole 55' on the disc passes beneath the pin of the solenoid, the pin drops in the hole 55' thereby locking the bridge 84 with the disc 74. Coupling the rotatable bridge 84 to the disc 74 effectively drives the sweep potentiometer 86 thereby causing the output of the oscillator to sweep through its frequency range. When the angular position of the disc 74 is such that the potentiometer 86 is at the beginning of its sweep from one extreme of its resistance to the other extreme (for example sweeping from 100K c.p.s. to 200K c.p.s.) the recording or storage cycle begins. The microswitches 93 and 94 are positioned so that the nipple 95 will pass over and close the switches in sequence. Logic circuitry (not shown) is employed in association with the microswitches so that when the selector switch is positioned to analysis-storage and the pin of the solenoid 55 drops into the hole 55' and the microswitches 94 and 93 are actuated in sequence, the storage or recording cycle begins, upon subsequent actuation of the microswitch 94 the cycle terminates.

Rotation of the disc 74 is in the direction of the arrow 96.

The reference signal, generated in block 45, is applied to the recording head 12 and is stored on the track 91. When the filter circuit 25 passes the signal from the balanced modulator 23, such signal, is applied to the detector 29 and modulator 33. The modulated signal which is proportional in amplitude and spectral width or density to the amplitude and spectral width or density of the input signal, is applied to the recording head 12 via the summing circuit 44 thus to the track 91.

The signal output of detector 29 is applied via lead 34 to switch S1 (assumed physically located in the drum 10 in FIG. 2), and via lead 37, chopper 35, lead 38 and the vertical amplifier 39 to the cathode ray tube 40.

Also, as disc 74 rotates, the horizontal sweep potentiometer 32 is driven, by the gear mechanism (not shown), and a signal for controlling the horizontal sweep of the cathode ray tube is applied via lead 36 to the horizontal amplifier 43 and via lead 48 to the cathode ray tube 40.

As the marker member 56 passes the inductive proximity impulse generator 54 a signal is applied via lead 57, lead 38, and the vertical amplifier 39, to the cathode ray tube 40.

When the disc 74 rotates and the conditions for the start of the recording cycle have been met (as previously described) the sweep oscillator is swept from its lowest frequency setting to its highest frequency setting in synchronism with the disc rotation. During this time storage is accomplished. When the nipple 95 subsequently reactuates the microswitch 94 the analysis-storage cycle is completed. As previously described, the reference signal and the analysis information are both applied to and stored on the magnetic track 91 and the analysis information is presented on the trace on the cathode ray tube.

The analysis-display cycle may be initiated by positioning the handle of the mode switch-drive selector, assumed connected to the end of rod 81 so as to position the switch contacts represented by the drum 10 so as to reposition switch S1 and select the driving means for rotating the disc 74 at the desired speed. Switch S3 would also be opened to prevent an input signal from being applied to the modulator 33. The recording-playback head 12 would also be switched via a mechanical or other means (not shown) so as to connect the head to the playback amplifier.

The rotatable bridge 84 is released from its coupled condition by energization of the solenoid 55 and the disc 74 is initiated into rotation from substantially the same position it was in when the analysis-storage cycle actually started.

As the disc 74 is rotated the playback head 12 picks up the magnetic impulses stored on the magnetic recording track and applies such impulse through lead 47 to the pair of parallel filters 49 and 50. The reference signal passing through filter 50 to detector 52 controls the gain control 51. The analysis information, when it appears at the playback head (according to its location on the track) is applied through the playback head to lead 47 and is passed by the filter 49 to gain control 51. The gain control output which is essentially proportional in characteristics to the characteristics of the analysis signal, as stored, is passed to the chopper 35 via the detector 53. As previously described the excursions of the wave output provided by the chopper are blanked out so that the extremes of the wave appear as an output of the chopper and are applied via lead 38 to the vertical amplifier 39 and thence to the cathode ray tube 40 for providing a base reference and upper reference on the trace. The analysis information passes through the chopper and is applied to the cathode ray tube via common circuitry thereby insuring linearity of display of the analysis information with respect to the references provided.

As the disc is rotated, the member 56, coupled to the disc 74 passes the inductive proximity sensing head 54 and provides an impulse applied via lead 57 and 38 to the vertical amplifier 39. The impulse serves as a frequency marker. The bridge 84 may be positioned or manually adjusted as by manually overcoming the spring 92, which normally holds the gears 82 and 83 disengaged, and engaging the gears 82 and 83 so as to rotate the bridge 84 thereby rotating both part of the potentiometer 86 and the impulse generator 54 thus changing the frequency of the sweep oscillator and the circumferential position of coincidence between the impulse generator 54 and the member 56. Since the controlled sweep of the sweep oscillator is essentially a conversion of frequency to time and thence to distance along the trace, then the frequency of the sweep oscillator may be determined as a function of distance along the trace on the display from the beginning of the trace.

The frequency marker, which appears as a "pip" on the cathode ray tube is related to the frequency of the sweep oscillator. By adjusting the frequency of the output of the sweep oscillator, the position of the frequency marker "pip" appearing along the trace on the cathode ray tube is also adjusted. Thus the frequency marker may serve as an aid to determine the frequency of the input signal since the frequency marker may be adjusted to a position along the trace where the analysis information of the input signal appears. The frequency of the input signal may then be determined as a function of distance along the trace on the cathode ray tube as indicated by the "pip." The amplitude of the analysis signal is a function of height above the base reference and spectral density is a function of the width and intensity of the signal.

During the cursory mode the solenoid 55 is deenergized and the retaining pin is extended so as to engage the hole 55' in the disc 74. This essentially locks the rotatable bridge 84 to the disc 74. It will be noted that the solenoid 55 and the inductive proximity impulse sensor are diametrically opposite each other on the bridge 84 while the hole 55' and the member 56 are diametrically opposite each other on the disc 74. Thus when the retaining pin of the solenoid 55 locks into the hole 55', the member 56 is adjacent the inductive proximity sensor and the frequency marker is essentially inoperative. Also during this latter cycle of operation the switch S3 is open so that recording of the input signal is not provided. However, the bias oscillator 61 is activated so as to erase or wipe off the magnetic track thereby providing a clean or cleared track, cleared or erased of heretofore implanted impulses.

During the manually operated cycle, the rotatable bridge 84 is also locked to the disc 74. However, the disc 74 is not driven and is free to be manually adjusted or rotated. With the bridge 84 locked to the disc 74 manual rotary displacement of the bridge 84, as by operation of the rod 60 so as to engage gear 82 with gear 83, also results in rotary displacement of the disc 74. In this mode the device serves as an electrical wave analyzer.

Although the present invention has been described and illustrated in its preferred form and arrangement, other forms and arrangements may be made as by rearrangement of and/or substitution of parts and/or components, as will be familiar to those skilled in the art, without departing from the spirit of the invention as defined in the appended claims.

What is claimed is:

1. A device for analyzing the characteristics of electric signals including;

a sweep oscillator having an output variable in frequency with respect to time, means for modulating the electric signal to be analyzed with the output of said sweep oscillator, means for filtering the modulated signal and for passing the modulated signal when said modulated signal is of a predetermined frequency.

threshold means for detecting characteristics of the modulated signal which differ from predetermined values of characteristics and for providing a signal output having characteristics which are proportional to the differences, recording means for recording the output signal of said threshold means during a predetermined time cycle, means for synchronizing the sweep oscillator with said recording means during said time cycle for sweeping said sweep oscillator through the frequency range of its output so that the sweep time of said sweep oscillator is the time of said time cycle, means for playing back the signal recorded on said recording means, means responsive to playing back by said playback means for releasing the sweep oscillator from synchronism with said recording means, and means for visually displaying the characteristics of the signal so played back on a cathode ray tube.

2. A device for analyzing the characteristics of electric signals as in claim 1 and in which said threshold means includes;
   a modulator for modulating the signal having characteristics which are proportional to the said differences for providing a low frequency modulated signal the characteristics of which are proportional to the characteristics of the analyzed electric signal, and said low frequency modulated signal is recorded on said recording means.

3. A device for analyzing characteristics of electric signals as in claim 1 and in which said threshold means includes;
   a modulator for modulating the signal having characteristics which are proportional to the said differences for providing a low frequency modulated signal having characteristics which are proportional to the characteristics of the analyzed electric signal;
   and said device further includes,
   means for generating a reference signal,
   means for summing said low frequency modulated signal and said reference signal and for providing an output having characteristics of the signals so summed, and
   means for applying the output of said summing means to said recording means.

4. A device for analyzing characteristics of electric signals as in claim 1 and further including;
   frequency marker means for providing a signal indication on the trace of said cathode ray tube,
   means for synchronizing said frequency marker means with said sweep oscillator, and
   means for adjusting the frequency of the output of said sweep oscillator and the position of said signal indication of said frequency marker means along the trace of said cathode ray tube so that the frequency of said sweep oscillator output is determinable as a function of the position of said signal indication on the trace of said cathode ray tube.

5. A device for analyzing the characteristics of electric signals including;
   a sweep oscillator having an output variable in frequency with respect to time,
   means for modulating the electric signal to be analyzed with the output of said sweep oscillator,
   means for filtering the modulated signal and for passing the modulated signal when the frequency of said modulated signal is a predetermined frequency,
   threshold means for detecting the characteristics of the modulated signal so passed which differ from characteristics of the output of said sweep oscillator and for providing a signal having characteristics which are proportional to the diffeernces,
   recording means for recording the output signal of said threshold means during a predetermined time cycle,
   means for synchronizing the sweep oscillator with said recording means during said time cycle for sweeping said sweep oscillator through the frequency range of its output so that the sweep time of said sweep oscillator is the time of said time cycle,
   means for playing back the signal so recorded during a second predetermined time cycle,
   means responsive to playing back by said playback means for releasing the sweep oscillator from synchronism with said recording means, and
   means for visually displaying the characteristics of the signal so played back on a cathode ray tube in which the vertical trace time of said cathode ray tube is equal to said second predetermined time.

6. A device for analyzing characteristics of electric signals as in claim 5 and further including;
   frequency marker means for providing a signal indication on the trace of said cathode ray tube during said second predetermined time cycle,
   means for synchronizing said frequency marker means with said sweep oscillator, and
   means operable during said second predetermined time cycle for adjusting the frequency of the output of said sweep oscillator and the position of the signal indication of said frequency marker means along the trace of said cathode ray tube so that the frequency of said sweep oscillator is determinable as a function of the position of said signal indication on the trace of said cathode ray tube.

7. A device for analyzing the characteristics of electric signals as in claim 5 and in which said recording means includes;
   a recording head for receiving said signal output of said threshold means and for applying impulses representing said signal output to a magnetic track,
   an endless magnetic track and
   means for driving said endless magnetic track at a first rotational speed,
   and said playback means includes,
   a playback head for playing back said impulses representing said signal output so applied to said magnetic track,
   said endless magnetic track and
   means for driving said endless magnetic track at a second rotational speed,
   and said visual display means includes,
   a horizontal amplifier coupled to said cathode ray tube for controlling the horizontal trace along said cathode ray tube and said device further includes,
   means for coupling said horizontal amplifier to said endless magnetic track for synchronizing the horizontal trace along said cathode ray tube with the rotation of said endless magnetic track.

8. A device for analyzing the characteristics of electric signals including;
   a sweep oscillator having an output variable in frequency with respect to time,
   means for modulating the electric signal to be analyzed with the output of said sweep oscillator,
   means for filtering the modulated signal and for passing the modulated signal when said modulated signal is of a predetermined frequency,
   means for detecting the characteristics of the modulated signal and for passing a signal having characteristics which differ from predetermined characteristics so that the characteristics of the passed signal are proportional to the characteristics of the said electric signals,
   means for modulating the last passed signal for providing a low frequency modulated signal having characteristics proportional to said electric signals,
   means for generating a reference signal of predetermined frequency and amplitude characteristics,
   means for summing the low frequency modulated signal and the reference signal,
   recording means for recording the output of said summing means during a predetermined time cycle,
   means for synchronizing the sweep oscillator with the recording means during said predetermined time cycle for sweeping said sweep oscillator through the frequency range of its output so that the sweep time of said sweep oscillator is the time of said predetermined time cycle,
   means for playing back the signal so recorded on said recording means during a second predetermined time cycle,
   means responsive to playing back of said recorded signal for releasing said sweep oscillator from synchronism with said recording means during said second predetermined time cycle,
   means for separating the played back signal into a first signal corresponding to and proportional to said low frequency modulated signal component and a second signal corresponding to and proportional to said reference signal component, means for controlling the gain of said first signal, means responsive to the characteristics of said second signal for controlling said gain control means, and means for visually displaying the characteristics of said first signal on a cathode ray tube so that the characteristics display are proportional to the characteristics of the said electric signal component of the modulated signal passed by said filtering means.

9. A device for analyzing the characteristics of electric signals including;

input means for applying electric signals thereto, a sweep oscillator having an output variable in frequency with respect to time, means for modulating said electric signals with the output of said sweep oscillator, means for filtering the modulated signal and for passing a signal the peak frequency of which is a predetermined frequency, said peak frequency so passed being related to the sweep time of said sweep oscillator, means for detecting the amplitude and spectral density of the signal so passed with respect to predetermined amplitude and spectral density values and for providing a signal output proportional thereto, means for providing a low frequency modulated signal proportional in amplitude and spectral density to the signal output of said signal detecting means, means for generating a reference signal of predetermined substantially constant frequency and amplitude, the frequency of which is substantially different from low frequency modulated signal, means for summing the low frequency modulated signal and the reference signal, storage means coupled to said sweep oscillator for controlling the sweep time of said sweep oscillator and coupled to said summing means for storing the summed signal in accordance with the sweep time of said sweep oscillator, means coupled to said storage means for converting said storage means into a playback means for playing back signals so stored in said storage means in accordance with the storage thereof and related to said sweep time, first filter means for filtering and passing signals representative of and proportional to the said low frequency modulated signal component of the summed signal so stored, second filter means for filtering and passing signals representative of and proportional to the said reference signal component of the summed signal so stored, a gain control, means coupling the signals passed by said second filter to said gain control for controlling the output of said gain control in accordance with the characteristics of the signals passed by said second filter, means coupling the signals passed by said first filter to said gain control for controlling the gain of said signals passed by said first filter in accordance with control of said gain control by the signals passed by said second filter, a cathode ray tube having connected thereto a vertical sweep amplifier and a horizontal sweep amplifier, said horizontal sweep amplifier coupled to said storage means for controlling the horizontal sweep in accordance with the sweep time of said sweep oscillator, a chopper coupled to said vertical sweep amplifier for providing upper and lower references in the vertical trace in accordance with the output of said chopper, and means for applying the output of said gain control to said chopper for applying said output to said cathode ray tube and displaying such output as a visual indication in the vertical trace in accordance with the amplitude and spectral density of said output and occurring in the horizontal sweep in accordance with time of passage of the first said modulated signal by the first mentioned said filter means, as related to the sweep time of said sweep oscillator.

10. A device for analyzing the characteristics of electric signals as in claim 9 and in which said storage means includes;

a recording head for applying signals applied thereto to a magnetic recording track as impulses representing signals so applied to said recording head, an endless magnetic recording track for storing impulses so applied by said recording head, and means for driving said endless magnetic recording track at a predetermined speed.

11. A device for analyzing the characteristics of electric signals as in claim 9 and in which said storage means includes;

a recording head, an endless track, and driving means for driving the endless track with respect to the recording head at a substantially constant predetermined speed, and said playback means includes, a playback head, said endless track, and second driving means for driving the endless track with respect to the playback head at a second substantially constant predetermined speed.

12. A device for analyzing the characteristics of electric signals as in claim 11 and in which the frequency of the said low frequency modulated signal is substantially 60 cycles per second and, the frequency of the said reference signal is substantially 120 cycles per second, and the signal passed by said first filter means is substantially 14,400 cycles per second, and the signal passed by said second filter means is substantially 28,800 cycles per second.

13. A device for analyzing the characteristics of electric signals as in claim 9 and in which said means coupling the signals passed by said second filter to said gain control includes;

a detector for distinguishing any change in the characteristics of said signal passed by said second filter from predetermined characteristics, and control over the said gain control by said signal passed by said second filter is inversely proportional to the change in characteristics so distinguished by said detector so that any distortion appearing on the signal passed by said first filter as a result of the playback function is compensated for by the gain control over said signal.

14. A device for analyzing the characteristics of electric signals including;

input means for applying electric signals thereto, a sweep oscillator having an output variable in frequency at a controlled time rate, a balanced modulator for modulating said electric signals with the output of said sweep oscillator for providing a variable frequency output, the frequency of which is lower than the current frequency of the sweep oscillator by the frequency of the signal at said input, means for filtering the modulated signal and for passing said signal when said signal reaches a predetermined frequency so as to convert the frequency of the input signal to time related to the sweep time of said sweep oscillator, means for detecting the amplitude and spectral density of the signal passed by the said filter means with respect to the amplitude and spectral density of the output of said sweep oscillator and for providing an output proportional to the excess amplitude and spectral density so detected, means for providing a low frequency signal proportional in amplitude and spectral density to the excess amplitude and spectral density so detected, means for generating a reference signal of substantially constant frequency and amplitude, a storage means, means coupled to said storage means and said sweep oscillator for driving said storage means and said sweep oscillator in synchronism, means for applying said reference signal to said storage means for storing said reference signal thereon and for summing said reference signal and said low frequency signal when said low frequency signal is provided and for applying the summed signal to said storage means for storage thereon, means for playing back the signals so stored in direct relation to the storage sequence, means for separating the played back signals into a first signal which is proportional to said low frequency signal component of the stored signal and into a second signal which is proportional to said reference signal component of the stored signal, a gain control for varying the gain of said first signal, means coupling said second signal to said gain control for controlling said gain control to vary the gain of said first signal so that the output of said gain control is proportional to the said low frequency modulated signal with respect to amplitude and spectral density, means for converting the last mentioned output into a visible signal, said visible signal being proportional to the amplitude and spectral density of said last mentioned output so that said visible signal is proportional in amplitude and spectral density to the amplitude and spectral density of said input electric signal.

15. A device for analyzing the characteristics of electric signals as in claim 14 and in which said means for converting is a cathode ray tube including a horizontal sweep amplifier means and a vertical sweep amplifier means and further including, means for coupling said horizontal sweep amplifier means to said means for driving so that said storage means and said sweep oscillator and said horizontal sweep amplifier means are in synchronism.

16. A device for analyzing the characteristics of electric signals as in claim 14 and in which said playback means includes;

a driving means, and means for coupling said driving means to said converting means so that said converting means and said playback means are driven in synchronism.

17. Apparatus for analyzing electrical signals comprising, sweep frequency oscillator means, means responsive to said sweep frequency oscillator means for modulating said electrical signals thereby, means for passing said modulated signals at a fixed predetermined frequency, means coupled to said previously mentioned means for producing storable signals proportional in amplitude and spectral density to the amplitude and spectral density of said electrical signals, memory means responsive to said storable signals for storage thereof, visual display means, means for displaying said storable signals through said visual display means simultaneously during storage thereof by said memory means, means for subsequently uncoupling said storable signal producing means and for preventing further visual display of said electrical signals, and means responsive to said uncoupling means for retrieving said storable signals from said memory means and for repeating the visual display thereof through said display means.

References Cited

UNITED STATES PATENTS

| 2,455,052 | 11/1948 | Fisher | 325—332 X |
| 2,931,899 | 4/1960 | Peterson | 325—336 X |
| 2,958,822 | 11/1960 | Rogers et al. | 324—77 |
| 3,119,961 | 1/1964 | Ambrose | 324—77 |

RUDOLPH V. ROLINEC, *Primary Examiner.*

ARCHIE R. BORCHELT, *Examiner.*

P. F. WILLE, *Assistant Examiner.*